United States Patent [19]

Ward

[11] 4,395,711
[45] Jul. 26, 1983

[54] INDUCTIVE SENSOR

[75] Inventor: Frank L. Ward, Exeter, N.H.

[73] Assignee: Clarostat Mfg. Co., Inc., Dover, N.H.

[21] Appl. No.: 280,067

[22] Filed: Jul. 2, 1981

Related U.S. Application Data

[62] Division of Ser. No. 137,994, Apr. 7, 1980, abandoned.

[51] Int. Cl.³ .................... G08C 19/06; G08C 19/12; G01B 7/14
[52] U.S. Cl. .............................. 340/870.31; 310/168; 324/208
[58] Field of Search ...................... 340/870.31, 870.32, 340/870.37; 324/207, 208, 173, 174; 310/168

[56] References Cited

U.S. PATENT DOCUMENTS

| | | | |
|---|---|---|---|
| 2,294,881 | 9/1942 | Alford | 340/870.31 |
| 3,132,337 | 5/1964 | Martin | 324/174 |
| 3,176,241 | 3/1965 | Hogan et al. | 324/208 |
| 3,906,356 | 9/1975 | Manabe et al. | 340/870.32 |

Primary Examiner—James J. Groody
Attorney, Agent, or Firm—Kane, Dalsimer, Kane, Sullivan and Kurucz

[57] ABSTRACT

A sensor which conveys a displacement of an object into a change of inductance with which associated circuitry can be used for monitoring the displacement of the object. The sensor includes a coil maintained about a housing in which is disposed a ferromagnetic core about which is disposed a sleeve made of a conductive material movable between the core and the coil with the induction of the coil variable in accordance with a predetermined relationship to the displacement of the sleeve with respect to the core with the monitoring of the change in induction indicative of displacement of the object. The sensor can be designed for determining both axial or rotational displacements of an object.

3 Claims, 6 Drawing Figures

INDUCTIVE SENSOR

This is a division, of application Ser. No. 137,994, filed Apr. 7, 1980, now abandoned.

FIELD OF THE INVENTION

This invention relates to an inductive transducer for converting mechanical displacement into a change in inductance which varies as a function of said displacement.

BACKGROUND OF THE INVENTION

There exist many known transducers from which an electrical signal is derived. Common examples are electrical resistances, and inductances, where an element by its deflection allows the generation of an electrical quantity.

The resistor transducer necessitates the contact of elements which results in friction. This not only causes unwanted wearing but also requires the initial threshold of force to overcome the friction. This may limit the applicability of the device where minute displacements are involved. Also, the threshold level which must initially be overcome will vary as a result of the wearing of the elements thereby causing varying outputs for the same displacement.

A solenoid transducer is an example of a well known inductive transducer. Usually, the devices involves a freely movable ferromagnetic core which is moved in an out of a coil to vary the inductance of the coil.

SUMMARY OF THE INVENTION

It is an object of the invention to provide a sensor of mechanical displacement, through the use of an inductive transducer which allows for accurate control of the output characteristics.

Another object is to provide for a sensor which can be designed in certain configurations for axial displacement and in other configurations for rotational displacement.

A yet further object is to provide for an inductive transducer which is accurate yet relatively inexpensive to produce; small in size and which may be readily modified to suit customers desired output.

These and other objects are achieved by the present invention hereinafter described. A basic embodiment of the invention provides for a ferromagnetic core i.e., ferrite, to be located within a conductive tube having a shaft adjacent thereto. The core and tube are located in a housing which has a winding or coil located thereabout. In this embodiment and those hereinafter described, the housing, which may be made of a plastic material, advantageously provides the bearing surface with the tube rather than the ferrite, thereby allowing less friction, wear and longer use than when the ferrite provides the bearing surface.

The induction of the coil depends upon the position of the conductive tube. When the tube is completely shielding the core, the induction of the coil is low with the conductive tube shorting the flux lines. As the shaft is displaced so is the conductive tube thereby exposing the core to the coil. This core offers much less reluctance than the conductive tube and serves to increase the flux density and induction of the coil. The reverse is true as the tube is placed over the core so that a change in induction of the coil is a function of the displacement of the shaft. This change in induction can then be used to monitor the position of the shaft.

In a similar embodiment, a fixed conductive tube is placed over the core with said tube having a slot exposing the core. An outer conductive tube, connected to a shaft, is provided wherein a change in induction of the coil is a function of a change in position of the shaft and the shape of the slot and illustrates how the device might be modified readily to vary its output so as to accommodate varying customer demands.

A yet another embodiment of the invention provides for a core to be movable in and out of the winding in conjunction with a conductive tube, providing for a means of monitoring the longitudinal displacement of the core, and object attached thereto, in a manner as aforementioned.

Another embodiment of the invention provides for sensing rotational displacement with a core fixed within a winding as noted in previous embodiments. A fixed inner conductive tube having a slotted portion is then placed surrounding the core. An outer tube with an adjacent shaft attached thereto is then provided outside the inner tube. This outer tube is also made of conductive material and has a slotted portion. As the outer tube rotates, the high frequency induction of the coil will increase to a maximum when the two slots are aligned exposing the largest area of the core. The change in induction can then be used to monitor the rotational displacement of the shaft.

A similar embodiment to that immediately preceeding, further utilizes a slotted outer tubing around the rotating tube attached to the shaft to provide a more complete isolation of the core from the coil when so desired.

A yet further embodiment utilizes a coil having a cylindrical element which rotates therein said element having a portion of high permeability and a portion of conductive material wherein the rotation of this element causes an increase in induction of the coil when the high permeability portion is positioned to increase the flux density and a decrease in induction when the conductive material causes a short in the flux lines formed. Thus, a change in the rotation displacement of said element may be determined by monitoring the change in induction of the coil.

DETAILED DESCRIPTION OF THE DRAWINGS

Figure 1:
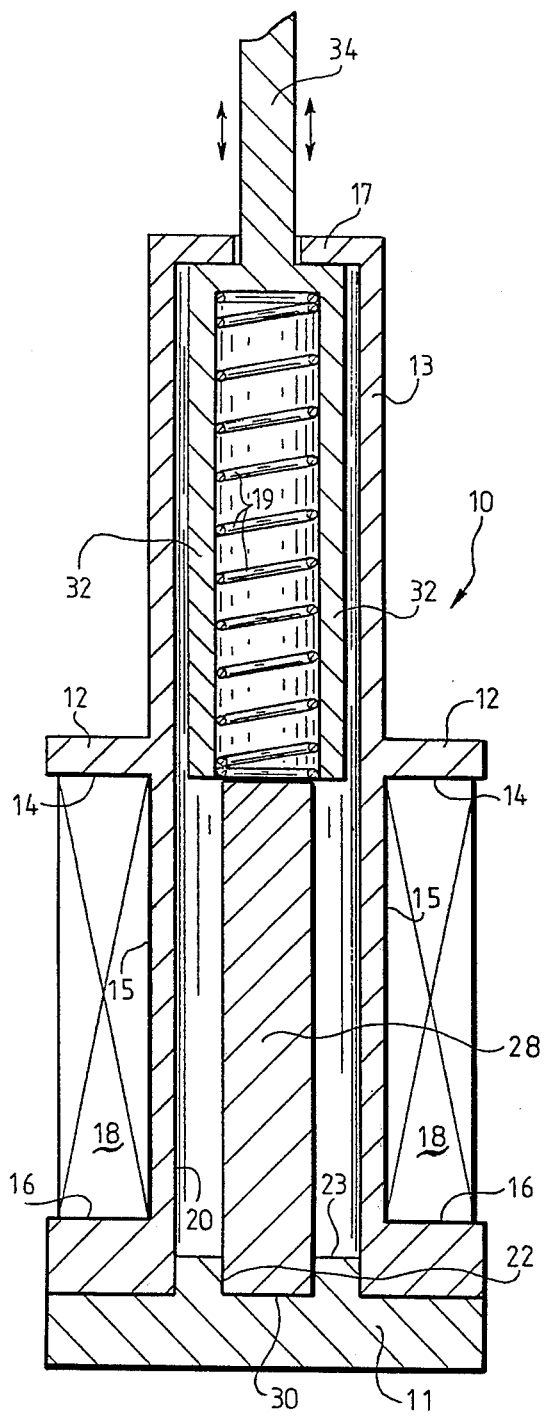
FIG. 1 is a sectional view of a sensor assembly which monitors axial displacement of the shaft constructed in accordance with the teachings of the invention.

With regard to FIG. 1, the device 10 is shown having a coil bobbin or housing 12 being cylindrical in shape. The bobbin 12 has an external annular grooved portion defined by surfaces 14, 15 and 16 which provides a receptacle for a coil winding 18. The bobbin is supported by socket member 11. The socket member and bobbin are formed of an electrically insulating material such as plastic and can be a single member if desired.

An internal cylinder bore, defined by surface 20, is provided in the bobbin 12 and a cylindrical socket 22 is provided in member 11 to support a cylindrical core 28 therein, preferably made of ferrite, which is mechanically attached to the bobbin at surface 30. The bobbin is provided with an upward extension 13 with an inwardly directed annular flange stop 17.

With the core 28 in the bore of the bobbin, a slot exists and is defined by the surface of the core 28 and the internal surface 20 of the bobbin. An outer tube or sleeve 32 made of a conductive material, i.e., copper, silver, etc., is provided having an internal diameter greater than that of the diameter of the core and an external diameter less than the diameter of the bore. A shaft 34 is provided as an extension of tube 32 and which can be the receptacle for the displacing force. The sleeve 32 is of such diameter as to be contained in the bobbin by flange 17 when spring pressed upwardly by spring 19 in the normal position thereon.

While it is depicted integrally with the tube 32 in FIGS. 1-4, this is unnecessary but a preferred manner of construction. As shown, the tube 32 can be longitudinally disposed in the bore between surface 20 and the core 28 with a space between the bobbin, tube and core so that contact and resulting wear is eliminated. When the tube is fully disposed in the bore it would abut surface 23.

The operation of the device is relatively simple. As the shaft 34 is axially displaced with respect to the core, the tube is likewise displaced. If it is displaced towards the core, with the tube being inserted over the core, the high frequency inductance of the coil decreases with the decrease in the core area and the flux lines exposed thereto. The reverse is true as the tube is withdrawn from the bore, thereby exposing greater core area and flux lines, increasing the induction of the coil. The greatest induction of the coil would exist when the tube is fully withdrawn; the least would be when the tube was fully inserted in the bore. Intermediate positions of the tube will cause proportional changes in the induction and resulting electrical output of the coil wherein predetermined variations of tube position and electrical output may be used to determine the position of the shaft at any given time without contact as between the elements causing undesirable results.

In operation therefore, in the absence of the shield, the lines of magnetic flux take the path of least resistance and use the ferrite as the path of travel. A shield of reasonable thickness, when in position, acts as a single coil short about the ferrite, increasing the back emf and tending to prevent the flux lines from passing through the ferrite.

An interesting phenomenon is that of skin effect. Skin effect is that phenomenon wherein current density in a conductor tends to be greater at the conductor surface—the higher the frequency the greater the effect. At the higher frequencies the skin effect tends to decrease conductivity and hence functional thickness of the shield. The thickness of the tube must therefore be greater than the calculated skin depth for a minimum operating frequency.

Figure 2:
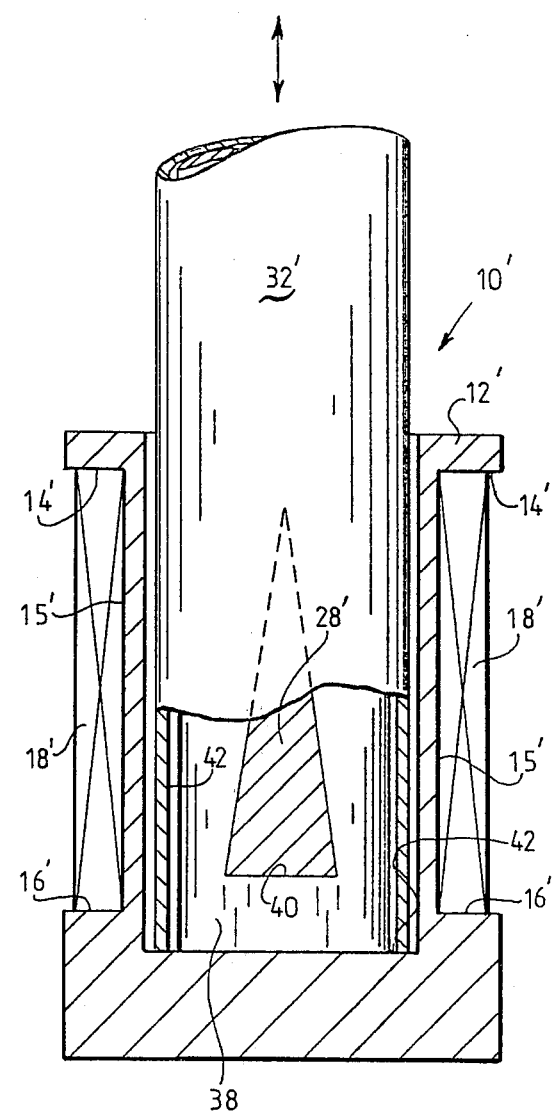
FIG. 2 is a partially sectional view of the sensor assembly similar to FIG. 1 but incorporating a slotted inner tube of conductive material.

With regard now to FIG. 2, a somewhat similar embodiment is depicted as that in FIG. 1 with like parts similarly numbered and designated with a prime. This embodiment however is provided with an inner tube 38 inserted over the core 28'. The tube 38 is made of a conductive material and fitted with a triangular slot 40 intermediate the ends of the tube 38 thereby allowing a shorting path for circulation of currents in the tube. When the outer tube 32' is withdrawn from the bore, it exposes a portion of the core 28' defined by the slot 40 to the bobbin 12' and coil 18' thereon.

The core 28' is mechanically attached to the bobbin via the inner tube 38. The outer tube 32' when fully disposed in the bore abuts surface 42. Displacement of the outer tube 32' causes a change in inductance of the coil as a function of the shape of the slot. While a triangular slot is depicted, this is merely illustrative and of course any shape or number of slots may be used as desired.

As the outer tube 32' is inserted axially over the inner tube 38 and core 28', the high frequency inductance of the coil decreases as function of the shape of the slot. The reverse is true when the outer tube is withdrawn. Variation of the induction of the coil from a maximum to a minimum may then be used to monitor the position of the shaft, as aforementioned with regard to FIG. 1, without undesirable contact as between the elements.

Figure 3:
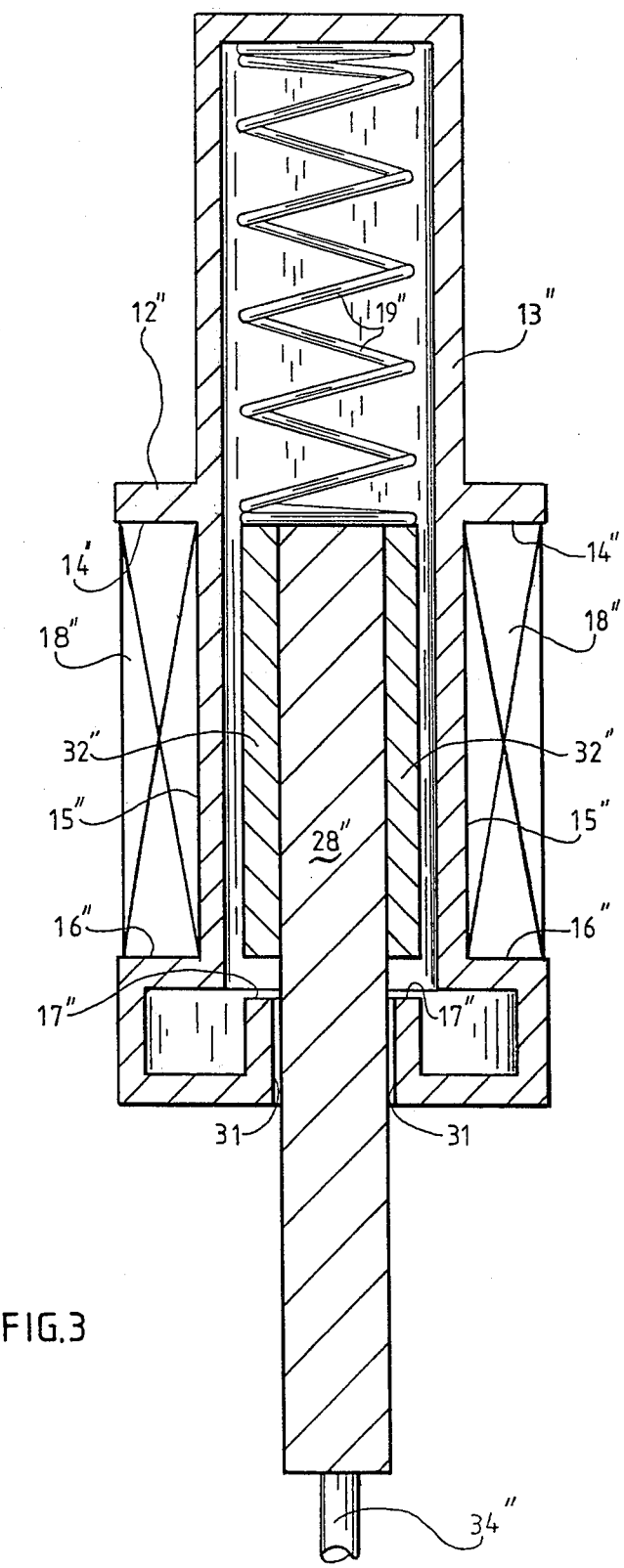
FIG. 3 is a view similar to that of FIG. 1 wherein there is depicted an embodiment in which the ferrite with tube attached is longitudinally displaced with respect to the winding.

Turning now to FIG. 3, like parts to previous embodiments are similarly numbered and designated with primes. The bobbin 12" supporting winding 18" has a bearing surface 31 for sliding support of ferrite 28" within the bobbin bore with shield 32" rigidly affixed to the upper end thereof and spring pressed by spring 19" against stop surface 17" of bobbin 12".

Movement of ferrite 28" in FIG. 3 against the action of spring 19' exposes the portion of the ferrite 28" which is unshielded to the coil 18" providing an indication of position of ferrite 28" and any mechanical shaft 34" or other mechanical member attached thereto, so as to allow monitoring of its displacement.

Figure 4:
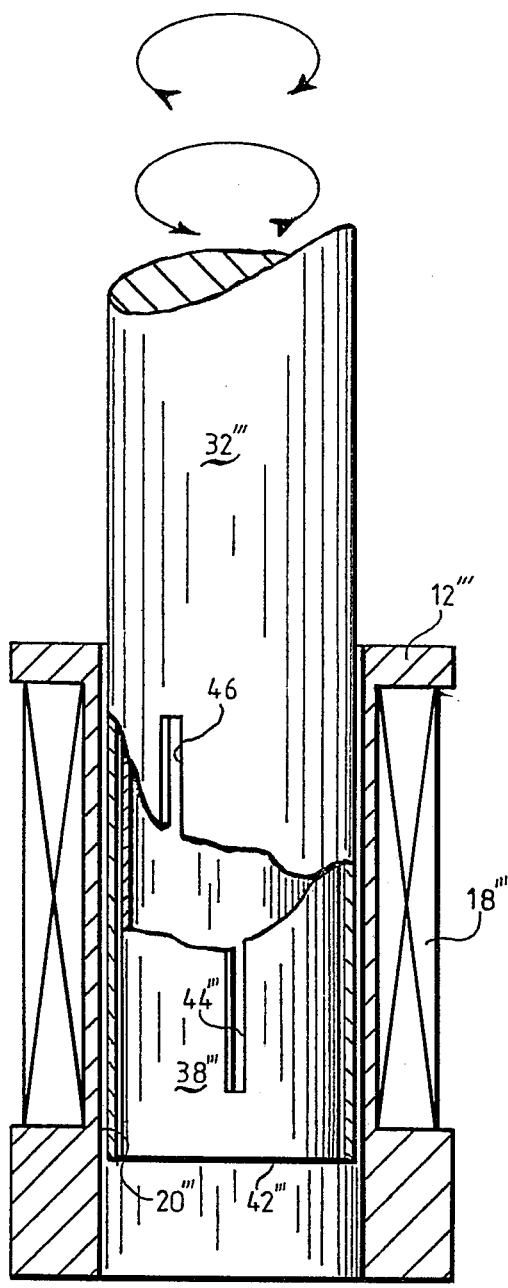
FIG. 4 is a partially sectional view of a sensor assembly which monitors rotational displacement of the shaft incorporating a fixed slotted inner tube and a rotational slotted outer tube.
Figure 5:
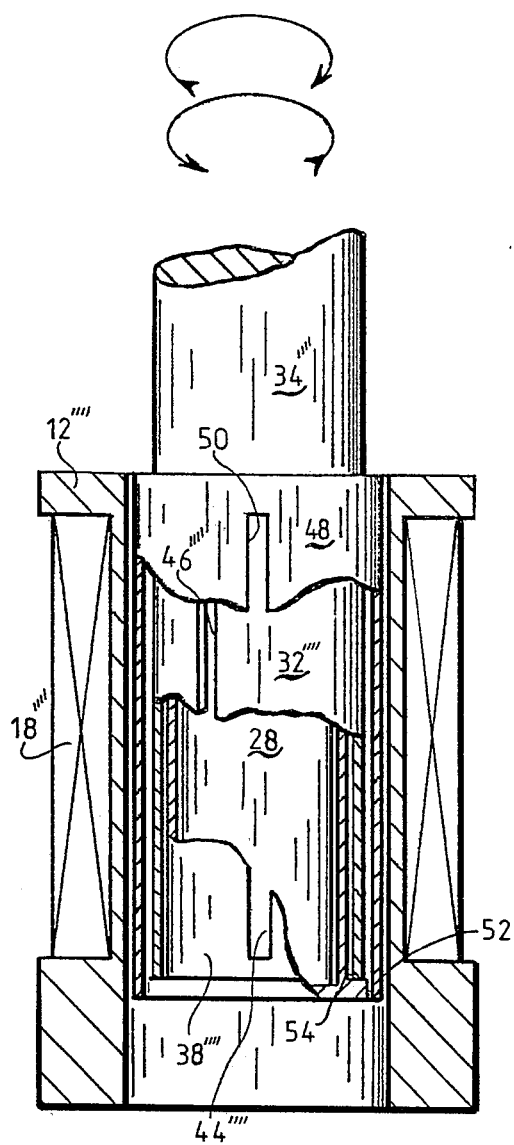
FIG. 5 is a partially sectional view of a sensor assembly similar to FIG. 4 but utilizing fixed slotted inner and outer tube with a rotational slotted tube disposed therebetween.

In FIGS. 4 and 5 the devices depicted are for measuring the rotational displacement of the shaft with parts similar to the previous embodiments numbered accordingly with primes following. The respective cores and inner tubes are again mechanically attached to the respective bobbins 12''' and 12''''.

The inner tube 38''' in FIG. 4 is provided with a longitudinal slot 44''' intermediate its end and is rotationally fixed with respect to the outer tube. The outer tube 32''' is provided with a longitudinal slotted portion 46 and is rotatable about the inner tube 38''' while disposed in the bore of the bobbin without being in contact with surface 20''' or radially adjacent surfaces of tube 38'''. The only contact that the tube has is with surface 42''' of tube 38''' during rotation. Even this contact can be eliminated by locating the tube 38''' slightly off said surface at the expense of a minimal leakage since the slots and the inner and outer tube would provide a tortured path of flux.

In operation, as the outer tube 32''' is rotated, the high frequency inductance of the coil will increase to a maximum when the two slots, 44''' and 46 expose the largest core area to the coil, and a minimum when the core is completely shielded from the coil. A monitoring of the change in inductance of the coil and resulting electrical output allows the determination of the rotational displacement of the shaft to be ascertained.

With regard particularly to FIG. 5, this embodiment is very similar to that depicted in FIG. 4 except that in addition a conductive tube 48 is provided disposed between the tube 32'''' and the surface 20'''' of the bore in the bobbin 12''''. The inner tube 38'''' may be fabricated having a step arrangement at its closed end providing surfaces 52 and 54, to abut tubes 32'''' and 48 as shown. The tube 48 is also provided with a slot 50, and is rotationally fixed with respect to tube 32''''. So disposed, tube 32'''' rotates as a result of a rotational force on the shaft 34''''. The additional tube 48 provides increased core isolation when the slots 44'''' and 46'''' are not aligned. This gives a more precise monitoring when induction of the coil, due to aligning of the slots, is at a maximum and when not aligned, at a minimum, thereby inhibiting leakage flux and enhancing the monitoring of the rotational displacement. This is due to the fact that the leakage path is longer in this embodiment than that depicted in FIG. 4. The longer the leakage path, the greater the the reluctance of the path and in turn the greater reluctance to flux.

Figure 6:
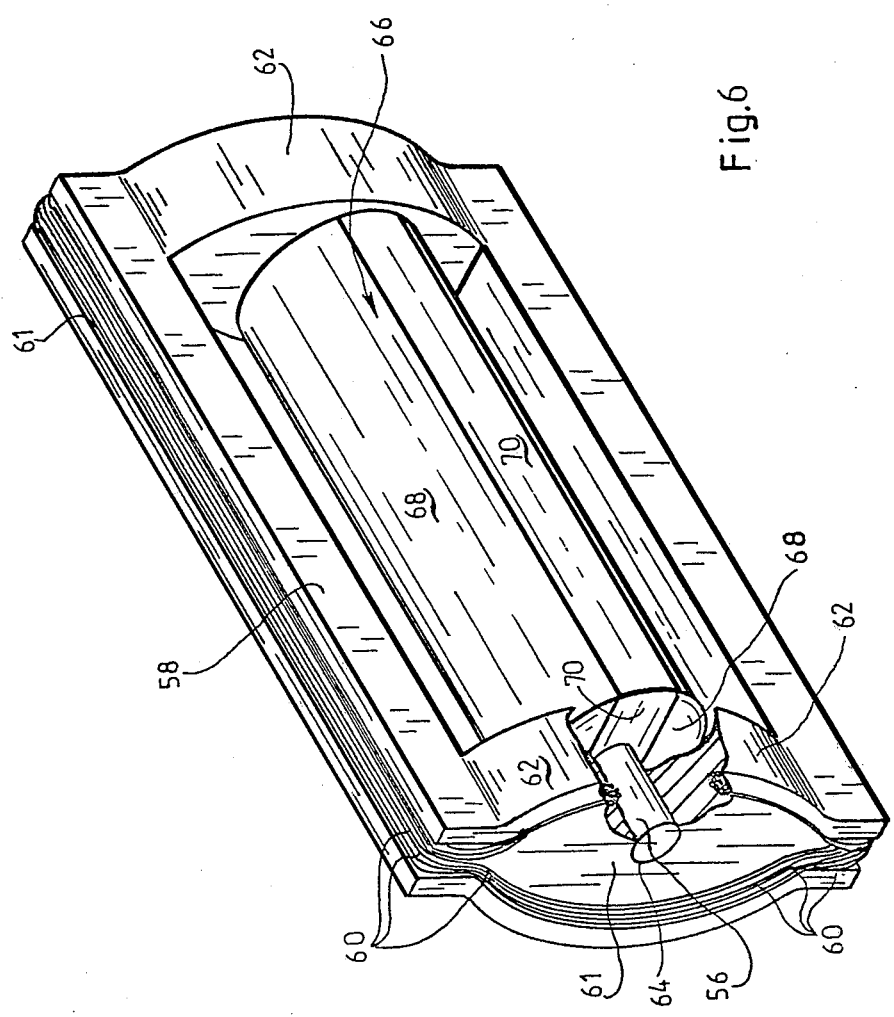
FIG. 6 is a partially sectional view of a sensor assembly utilizing a cylinder type element whose rotation results in variation of induction of the coil windings.

With regard now to FIG. 6, another embodiment of the present invention is depicted. The purpose of this device is to measure the rotation displacement of a cylindrical shaft 56. The shaft may be connected to any number of devices where monitoring rotational displacement of the particular device is important. As in the case of the devices depicted in FIGS. 4 and 5, the size of the operating device remains the same due to the absence of the need for axial movement of the displaced element.

In the device as shown, there is provided a hollow rectangular bobbin 58 having with somewhat oval vertical members 62 and a winding 60 located in a groove 61 located about the circumference of the bobbin. Each of the bobbins vertical members 62 is provided with a bore 64 which provides a seat for shaft 56. Circumscribed about the shaft 56, intermediate the vertical members 62, is a cylindrical core 66. This core should be made of a magnetic material of high permeability such as ferrite. A portion of the core 66 is covered by a conductive shield 68 which, as shown, is so displaced so as to allow only a strip 70 of the core to be exposed to the coils 60.

In operation, the rotational displacement of the core 66 would be a result of the rotational displacement of the shaft 56 and whatever device being monitored attached thereto. As the core rotates it would expose alternatively the strip 70 of magnetic material and then the conductive shield 68 to the coil. Whatever flux lines are established by the coil with the rotating strip 70 are then shorted out as the conductive shield 68 rotates into that position. As a result of this, the induction of coils 60 will vary as the cylindrical core 66 rotates. The changes in induction results in a change in electrical output of the coils which can be monitored, thereby monitoring the rotational displacement of the shaft 56.

As is evident from each of the embodiments discussed herein, they are relatively simple in construction and operation and essentially reduce or eliminate the wearing of elements. Also, they can be fabricated in any size to suit the desired purpose. Although somewhat preferred embodiments have been disclosed and described herein, it should be understood that this invention is in no sense limited thereby and their scope is to be determined by that of the appended claims.

What is claimed is:

1. A sensor which converts the rotational displacement of an object into an electrical signal for monitoring said displacement, said sensor having: a housing; a coil having a center axis through which flux lines from said coil pass when an electric current is applied thereto; the coil being wound about said housing; a rotational element axially positioned in said housing and disposed with its axis of rotation transverse to the center axis of the coil; the rotational element being adapted to receive a rotationally displacing force from said object; said rotational element being comprised of alternate portions of conductive material and magnetic material which transverse the cnter axis of the coil with sufficient portions to allow the variable concentration of flux lines through the center axis; wherein the induction of the coil is variable as a function of the rotation of said element in said coil which rotates alternately the portions of magnetic material and conductive material so that flux lines are established and then shorted so as to vary the induction of the coil gradually and cyclically between a minimum and maximum and a monitoring of which indicates the displacement of said object.

2. The device in accordance with claim 1 wherein the housing has a hollow portion in the center thereof and the rotational element is cylindrical in shape with a cylindrical shaft supported at each end by said housing and said shaft is capable of receiving a rotational displacement force thereon; said magnetic portion includes at least two portions disposed at 180° with respect to each other on said rotational element with conductive portions disposed between said magnetic portions.

3. The device in accordance with claim 2 wherein the coil is wound about the perimeter of the housing and is positioned in a grooved surface located on said perimeter of said housing.

* * * * *